United States Patent
Anne et al.

(10) Patent No.: US 7,983,892 B2
(45) Date of Patent: Jul. 19, 2011

(54) SYSTEM AND METHOD FOR ACCESSING AND PRESENTING HEALTH INFORMATION FOR FIELD DEVICES IN A PROCESS CONTROL SYSTEM

(75) Inventors: Gowtham Anne, Karnataka (IN); Yeshwant Sabaji Desai, Karnataka (IN); Bobby Varghese Alexander, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 544 days.

(21) Appl. No.: 12/123,658

(22) Filed: May 20, 2008

(65) Prior Publication Data

US 2009/0292996 A1 Nov. 26, 2009

(51) Int. Cl.
*G06F 9/445* (2006.01)
*G05B 11/01* (2006.01)

(52) U.S. Cl. .......... 703/22; 715/700; 715/736; 715/764; 700/17

(58) Field of Classification Search .......... 703/22, 703/2; 715/736, 764, 700; 792/25; 700/17, 700/83
See application file for complete search history.

(56) References Cited

U.S. PATENT DOCUMENTS

| | | | |
|---|---|---|---|
| 6,105,119 A * | 8/2000 | Kerr et al. | 711/219 |
| 6,179,489 B1 * | 1/2001 | So et al. | 718/102 |
| 6,298,377 B1 | 10/2001 | Hartikainen et al. | |
| 2002/0087308 A1 | 7/2002 | Ozawa | |
| 2002/0104586 A1 | 8/2002 | Morikawa et al. | |
| 2002/0120723 A1 | 8/2002 | Forth et al. | |
| 2002/0161940 A1 | 10/2002 | Eryurek et al. | |
| 2003/0135563 A1 | 7/2003 | Bodin et al. | |
| 2004/0165544 A1 | 8/2004 | Cornett et al. | |
| 2004/0167750 A1 | 8/2004 | Pagnano et al. | |
| 2004/0259533 A1 | 12/2004 | Nixon et al. | |
| 2006/0217822 A1 | 9/2006 | Ramanathan et al. | |
| 2007/0100471 A1 | 5/2007 | Kumar et al. | |
| 2009/0035740 A1 * | 2/2009 | Reed et al. | 434/265 |
| 2009/0036111 A1 * | 2/2009 | Danford et al. | 455/419 |
| 2009/0259612 A1 * | 10/2009 | Hanson | 706/47 |
| 2009/0292524 A1 | 11/2009 | Anne et al. | |
| 2009/0292995 A1 | 11/2009 | Anne et al. | |

FOREIGN PATENT DOCUMENTS

WO WO 03/075206 A2 9/2003
* cited by examiner

*Primary Examiner* — Thai Phan
(74) *Attorney, Agent, or Firm* — Munck Carter, LLP

(57) ABSTRACT

A system includes a server configured to generate a request for status information and/or diagnostic information associated with a field device in a process control system. The system also includes an interface component having (i) an emulator configured to emulate a device manager associated with the field device and (ii) a communication manager configured to communicate with the field device over a communication link using a specified protocol. The server is configured to provide the request to the communication manager through the emulator, receive the status information and/or the diagnostic information from the field device through the communication manager and the emulator, and generate a user interface based on the status information and/or the diagnostic information. The communication manager could represent a communication Device Type Manager (DTM), and the emulator could emulate at least some functions of a device DTM.

20 Claims, 4 Drawing Sheets

SYSTEM AND METHOD FOR ACCESSING AND PRESENTING HEALTH INFORMATION FOR FIELD DEVICES IN A PROCESS CONTROL SYSTEM

CROSS-REFERENCE TO RELATED APPLICATIONS

This disclosure is related to the following U.S. patent applications:

U.S. patent application Ser. No. 12/123,631 entitled "SYSTEM AND METHOD FOR ACCESSING AND CONFIGURING FIELD DEVICES IN A PROCESS CONTROL SYSTEM"; and U.S. patent application Ser. No. 12/123,680 entitled "SYSTEM AND METHOD FOR ACCESSING AND CONFIGURING FIELD DEVICES IN A PROCESS CONTROL SYSTEM USING DISTRIBUTED CONTROL COMPONENTS".

All of these patent applications are hereby incorporated by reference.

TECHNICAL FIELD

This disclosure relates generally to process control systems and more specifically to a system and method for accessing and presenting health information for field devices in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or PROFIBUS. These types of protocols often support the use of a structured language called the Electronic Device Description Language ("EDDL"), which is defined in the IEC 61804-3 standard. This language can be used to create device description or electronic device description ("DD/EDD") files, which describe the online functional behavior of the field devices. The DD/EDD files can be interpreted by a host application and used to control interactions with and configuration of the field devices.

Another standard technology used with field devices is Field Device Tool/Device Type Manager ("FDT/DTM") technology, which is defined in the IEC/PAS 62453 standard. This technology defines components that support "plug-and-play" use of field devices. For example, a device DTM is a component that defines a field device's configuration, and it includes a user interface for interacting with the field device. A communication DTM is a component that defines an interface for communicating with a field device using a specific protocol. Multiple communication DTMs could be provided to support communications using different protocols. A communication DTM interfaces with the host application through a field device's device DTM. As a result, the host application can merely create an instance of the appropriate device DTM and link the device DTM with the appropriate communication DTM. At this point, the host application can communicate with the field device, and the user can interact with the field device.

SUMMARY

This disclosure provides a system and method for accessing and presenting health information for field devices in a process control system.

In a first embodiment, a method includes generating a request for status information and/or diagnostic information associated with a field device in a process control system. The method also includes providing the request to a communication manager through an emulator. The emulator emulates a device manager associated with at least the field device, and the communication manager is configured to communicate the request to the field device over a communication link using a specified protocol. The method further includes receiving the status information and/or the diagnostic information from the field device through the communication manager and the emulator. In addition, the method includes generating and presenting a user interface based on the status information and/or the diagnostic information.

In particular embodiments, the communication manager represents a communication Device Type Manager (DTM), and the emulator emulates at least some functions of a device DTM.

In other particular embodiments, the method also includes mapping the status information and/or the diagnostic information from the field device to corresponding information defined by a device description or electronic device description (DD/EDD) file associated with the field device. The user interface is generated based on the mapping.

In yet other particular embodiments, the method also includes interpreting the status information and/or the diagnostic information using a device description or electronic device description (DD/EDD) file associated with the field device. The user interface is generated based on the interpretation.

In still other particular embodiments, the method also includes comparing the status information and/or the diagnostic information to cached status information and/or cached diagnostic information. Generating the user interface could include updating the user interface if the status information differs from the cached status information or the diagnostic information differs from the cached diagnostic information.

In other particular embodiments, the request is provided to the communication manager, and the status information and/or the diagnostic information is received from the field device (both without using an actual device manager designed for the field device).

In additional particular embodiments, the method also includes providing requests to multiple field devices in the process control system through the emulator and at least one communication manager. The method further includes receiving the status information and/or the diagnostic information from each of the field devices through the emulator. In addition, the method includes updating the user interface based on the received status information and/or the received diagnostic information.

In a second embodiment, a system includes a server configured to generate a request for status information and/or diagnostic information associated with a field device in a process control system. The system also includes an interface component having (i) an emulator configured to emulate a device manager associated with the field device and (ii) a communication manager configured to communicate with the field device over a communication link using a specified protocol. The server is configured to provide the request to the communication manager through the emulator, receive the status information and/or the diagnostic information from the field device through the communication manager and the emulator, and generate a user interface based on the status information and/or the diagnostic information.

In a third embodiment, an apparatus includes a memory configured to store status information and/or diagnostic information associated with a field device in a process control system. The apparatus also includes a processor configured to generate a request for the status information and/or the diagnostic information. The processor is also configured to provide the request to a communication manager through an emulator. The emulator is configured to emulate a device manager associated with at least the field device, and the communication manager is configured to communicate the request to the field device over a communication link using a specified protocol. The processor is further configured to receive the status information and/or the diagnostic information from the field device through the communication manager and the emulator. In addition, the processor is configured to generate and present a user interface based on the status information and/or the diagnostic information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
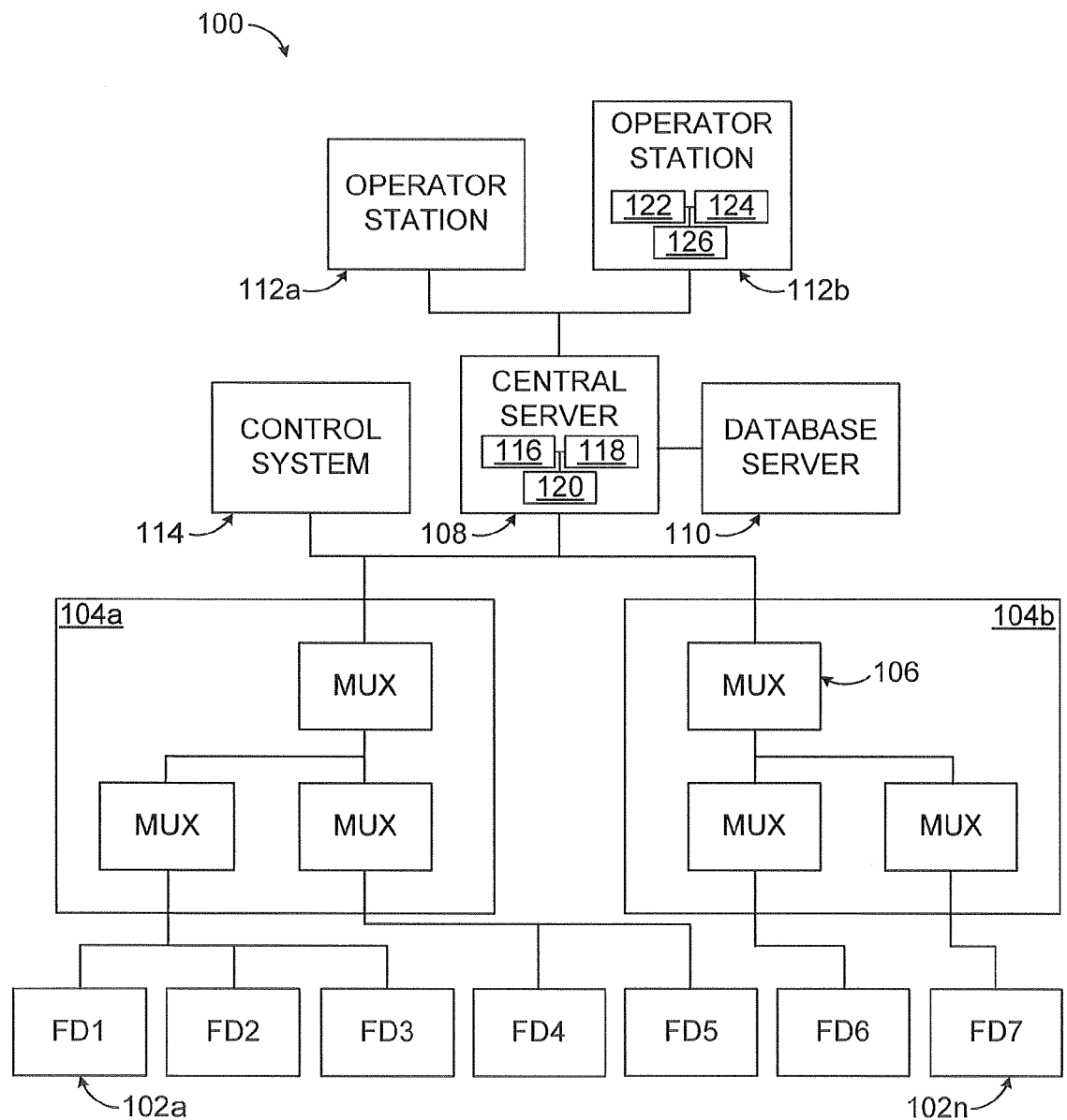
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

As shown in FIG. 1, the process control system 100 includes various field devices 102a-102n. The field devices 102a-102n represent devices that can perform a wide variety of functions in the process control system 100.

The field devices 102a-102n are used to implement desired control strategies in the process control system 100. For example, the field devices 102a-102n could include sensors that measure a wide variety of characteristics in a process system, such as temperature, pressure, or flow rate. The field devices 102a-102n could also include actuators that alter a wide variety of characteristics in the process system, such as valves or heaters. The field devices 102a-102n could include any other or additional components in any suitable process system. Each of the field devices 102a-102n includes any suitable structure for performing one or more functions to implement at least one control strategy. Also, a process system may generally represent any system or portion thereof configured to process one or more products or other materials in some manner.

Each of the field devices 102a-102n is coupled to one of multiple control networks 104a-104b in this example. Each of the control networks 104a-104b generally transports control signals and other data to and from the field devices 102a-102n. Each of the control networks 104a-104b includes any suitable structure(s) facilitating interaction with one or more field devices. Also, each of the control networks 104a-104b could support any suitable protocol or protocols for communicating with one or more of the field devices 102a-102n. These protocols could include HART, FOUNDATION Fieldbus, PROFIBUS, or other protocol(s). In addition, each of the control networks 104a-104b could have any suitable network topology, and the field devices can be connected in any suitable manner to the control networks 104a-104b.

In this example, each of the control networks 104a-104b includes multiple multiplexers 106. The multiplexers 106 support communications with multiple field devices over shared communication links. For example, each of the multiplexers 106 can receive signals from multiple field devices (either directly or through other multiplexers) and multiplex the signals onto a single communication link. Each of the multiplexers 106 can also receive signals over the single communication link and de-multiplex the signals for forwarding to the field devices. The destination for specific signals transmitted through the multiplexers 106 may be determined in any suitable manner, such as based on destination addresses contained in the signals. Each of the multiplexers 106 includes any suitable structure for multiplexing and demultiplexing signals. It may be noted that the use of multiplexers 106 in the control networks 104a-104b is for illustration only. The control networks 104a-104b could include any suitable components in any suitable configuration, such as various controllers and inputs/outputs in a distributed control system (DCS).

A central server 108 is coupled to the control networks 104a-104b. The central server 108 transmits data to and receives data from the field devices 102a-102n over the control networks 104a-104b. For example, the central server 108 could send status requests to the field devices 102a-102n and receive corresponding status or diagnostic information from the field devices 102a-102n. The status information could identify a status of a field device, and the diagnostic information could identify any specific problems with the field device. The central server 108 could also send configuration requests for configuring the field devices 102a-102n over the control networks 104a-104b. Any other or additional information may be transmitted to or received from the field devices 102a-102n. The central server 108 includes any hardware, software, firmware, or combination thereof facilitating access or control over one or more field devices. In particular embodiments, the central server 108 represents a computing device executing a MICROSOFT WINDOWS operating system.

A database server 110 is coupled to the central server 108. The database server 110 stores various information used, generated, or collected by the central server 108. For example, the central server 108 could use a device description (such as a device description/electronic device description or "DD/EDD" file) to issue requests to a field device, and the device description could be stored in the database server 110. Also, the central server 108 could retrieve status or diagnostic information associated with a field device and store the data in the database server 110. The database server 110 could store any other or additional information. The database server 110 includes any suitable structure facilitating storage and retrieval of information.

One or more operator stations 112a-112b are coupled to the central server 108. The operator stations 112a-112b represent computing or communication devices providing user access to the central server 108. The operator stations 112a-112b facilitate various interactions with users. For example, the operator stations 112a-112b could allow users to view information about and configure field devices through user interfaces provided by the central server 108. The operator stations 112a-112b could also allow users to review data collected or generated by the central server 108, such as status and diagnostic information retrieved from the field devices. Each of the operator stations 112a-112b includes any hardware, software, firmware, or combination thereof for supporting user access and control of the system 100. In particular embodiments, the operator stations 112a-112b represent computing devices executing a MICROSOFT WINDOWS operating system.

A control system 114 is also coupled to the control networks 104a-104b. The control system 114 represents a device or collection of devices that can control the operation of the field devices 102a-102n. For example, the control system 114 could receive data from certain field devices (such as sensors) and generate control signals for adjusting other field devices (such as actuators). The control system 114 generally represents any suitable hardware, software, firmware, or combination thereof for controlling the operation of one or more field devices and communication links between the field devices and the control system.

In particular embodiments, the central server 108 could include one or more processors 116 and one or more memories 118 configured to store instructions and data used, generated, or collected by the processor(s). The central server 108 could also include one or more interfaces 120 for communicating with external networks, devices, or systems, such as an Ethernet, HART, FOUNDATION Fieldbus, PROFIBUS, MODBUS, DEVICE-NET, or CAN interface. Similarly, each of the operator stations 112a-112b could include one or more processors 122 and one or more memories 124 storing instructions and data used, collected, or generated by the processor(s). The operator stations 112a-112b could also include one or more interfaces 126 for communicating with external networks or systems, such as an Ethernet interface.

In one aspect of operation, communications between the operator stations 112a-112b and the field devices 102a-102n can occur through the central server 108. Field Device Tool/Device Type Manager ("FDT/DTM") technology could be used to facilitate communications between the operator stations 112a-112b and the field devices 102a-102n. As noted above, FDT/DTM technology involves the use of communication DTMs accessible through device DTMs. Different communication DTMs are often provided for communications over different types of networks (such as multiplexer networks or other types of control networks). Also, the device DTMs can be used to facilitate communications with specific field devices or types of field devices through the appropriate communication DTMs.

The use of FDT/DTM technology could provide various benefits, such as the abstraction of specific communication mechanisms and protocols (used to communicate with field devices) from a host application. The host application can simply select the proper communication DTM for a particular field device and use the field device's device DTM to communicate through that communication DTM. However, FDT/DTM technology does have some drawbacks. One of these drawbacks is that the host application often does not have the flexibility to monitor field devices for status and diagnostic information when communication DTMs are used. Instead, using FDT/DTM technology, a user is often required to open each field device's configuration interface (defined by that field device's device DTM) and check the status and diagnostic information for that specific field device. This could be a time-consuming process in a system having hundreds or thousands of field devices.

In accordance with this disclosure, a device DTM can be emulated in the system 100 and used to retrieve status and diagnostic data from various field devices through appropriate communication DTMs. The status and diagnostic data could be presented to users via one or more graphical displays. The status and diagnostic data could also be cached locally and compared against any additional status and diagnostic data retrieved from the field devices. Differences between the status and diagnostic data can be used to update the graphical displays, enabling the system to quickly retrieve status and diagnostic data and to generate graphical displays for presenting the data. Additional details regarding this functionality are provided below.

Although FIG. 1 illustrates one example of a process control system 100, various changes may be made to FIG. 1. For example, the process control system 100 could include any number of field devices, control networks, servers, operator stations, and control systems. Also, the makeup and arrangement of the control networks 104a-104b are for illustration only. The control networks 104a-104b may or may not include multiplexers, and the control networks 104a-104b could include any suitable components in any suitable configuration. In addition, FIG. 1 illustrates one operational environment in which FDT/DTM components can be emulated to support retrieval of status and diagnostic data from field devices. This functionality could be used with any suitable devices and in any suitable systems.

Figure 2:
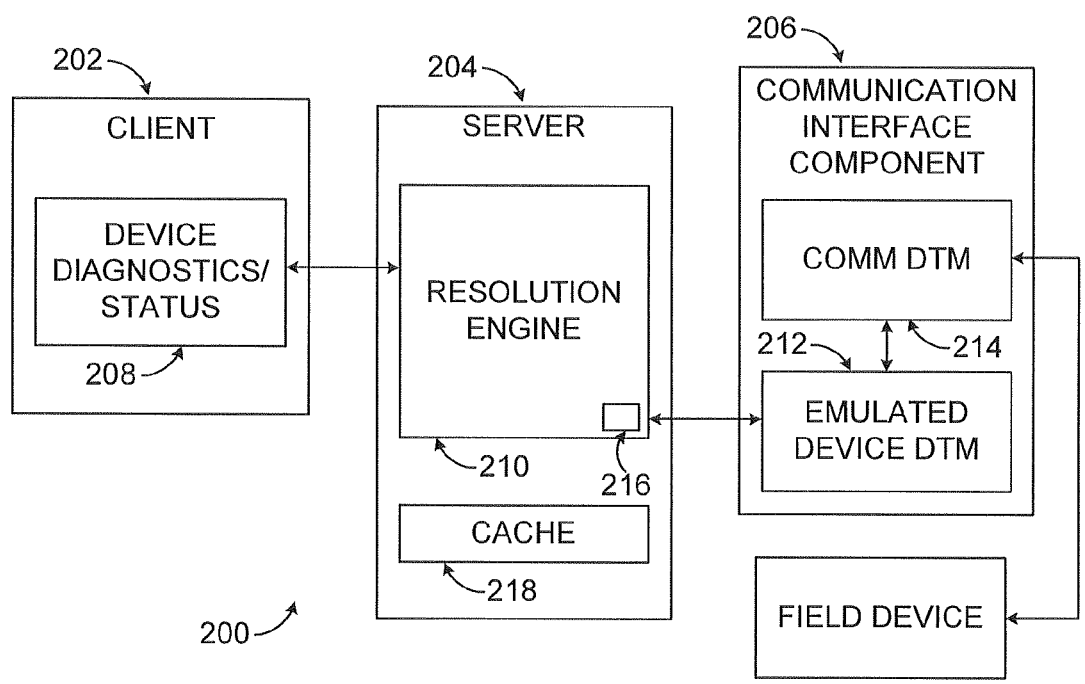
FIG. 2 illustrates an example mechanism for accessing and presenting health information for field devices in a process control system according to this disclosure.

FIG. 2 illustrates an example mechanism 200 for accessing and presenting health information for field devices in a process control system according to this disclosure. The embodiment of the mechanism 200 shown in FIG. 2 is for illustration only. Other embodiments of the mechanism 200 could be used without departing from the scope of this disclosure.

As noted above, EDDL allows DD/EDD files to be created that generally define the online functional behavior of field devices. Communications with the field devices can then occur in accordance with the DD/EDD files over standard or proprietary communication interfaces. In contrast, FDT/DTM provides access to field devices using device DTMs and communication DTMs. The communication DTM interfaces with a host application through the device DTM, which allows the host application to communicate with the field device through the communication DTM and the device DTM.

As shown in FIG. 2, a mechanism 200 is provided that enables the use of emulated device managers (such as emulated device DTMs), possibly along with device descriptions (such as DD/EDD files), to communicate with field devices. In FIG. 2, the mechanism 200 includes three main components: a client 202, a server 204, and a communication interface component 206. The client 202 could represent one of the operator stations 112a-112b in FIG. 1. The server 204 could represent the central server 108 in FIG. 1. The communication interface component 206 could represent a component executed by the central server 108 or the field device or a component that is located between the central server 108 and a particular field device. In general, it may be noted that multiple ones of these components 202-206 could be implemented on a single physical component or on different physical components. Each of these components 202-206 could include any suitable hardware, software, firmware, or combination thereof for performing the functions described below.

In this example, the client 202 includes a device diagnostics and status unit 208. The device diagnostics and status unit 208 generally represents a component (such as a software application) that can receive various diagnostic and status information related to one or multiple field devices and provide the information to a user. For example, the device diagnostics and status unit 208 could allow the user to identify specific field devices in a process control system. The device diagnostics and status unit 208 could then receive diagnostic and status information for those field devices and generate graphical displays that present the information in a convenient form. The device diagnostics and status unit 208 includes any hardware, software, firmware, or combination thereof for receiving and presenting field device diagnostic and status information.

To facilitate the retrieval of diagnostic and status information using FDT/DTM technology without requiring users to invoke individual device DTMs, the server 204 includes a resolution engine 210, and the communication interface component 206 includes an emulated device DTM 212 and a communication DTM 214. The communication DTM 214 defines the interface for communicating with the field device using a specific protocol (and often a specific type of communication link). Different communication DTMs 214 could be provided in the communication interface component 206 to support different communication protocols and homogenous or heterogeneous communication links (such as HART over PROFIBUS).

The emulated device DTM 212 allows interaction and communication between the resolution engine 210 and the communication DTM 214. The emulated device DTM 212 appears to be a valid device DTM to the communication DTM 214, so an active link can be formed between the communication DTM 214 and the emulated device DTM 212. This allows the emulated device DTM 212 to submit requests for diagnostic and status information to the communication DTM 214. In fact, this approach could be used to retrieve any suitable information from the field devices.

Figure 3:
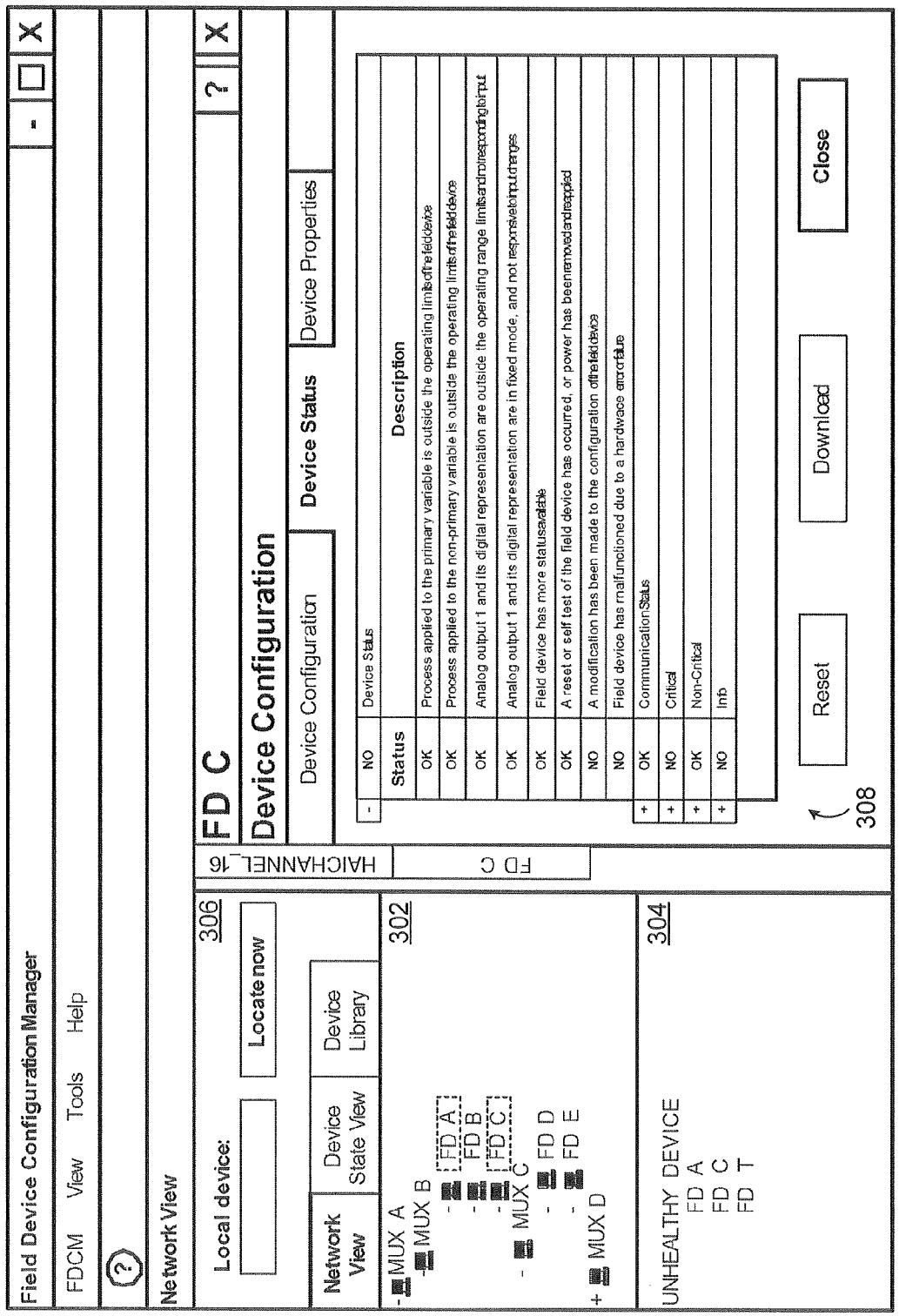
FIG. 3 illustrates an example user interface for accessing and presenting health information for field devices in a process control system according to this disclosure.

The resolution engine 210 performs a mapping or interpretation function for retrieved diagnostic and status information. For example, the resolution engine 210 could load a DD/EDD file 216 associated with a field device and use the contents of the DD/EDD file 216 to interpret diagnostic and status information received from that field device. The resolution engine 210 could then output a more detailed description of the diagnostic and status information to the client 202 for presentation to the user. As a particular example, if a field device returns a diagnostic data byte of 0x1F, the resolution engine 210 could use the field device's DD/EDD file 216 to determine that this value corresponds to a sensor failure in the field device. The resolution engine 210 could then output an alarm to the client 202 indicating a sensor failure in the field device. An example user interface through which the diagnostic and status information can be displayed to a user is shown in FIG. 3.

The resolution engine 210 can retrieve diagnostic and status information from field devices in any suitable manner. For example, the resolution engine 210 could query the field devices for diagnostic and status information at periodic or other specified interval(s) of time. Moreover, the resolution engine 210 can retrieve the diagnostic and status information from a number of field devices through the emulated device DTM 212 and one or multiple communication DTMs 214. This allows the diagnostic and status information to be retrieved in a manner that enables the use of the appropriate communication DTM(s) 214 without requiring users to manually invoke the field devices' device DTMs.

The resolution engine 210 could also include a cache 218, which can be used to locally store retrieved diagnostic and status information. When the resolution engine 210 receives new diagnostic and status information from a field device, the resolution engine 210 can compare the new diagnostic and status information to the cached diagnostic and status information. If the new and cached diagnostic and status information match, the resolution engine 210 need not update the graphical interface displayed to a user with the new diagnostic and status information. If the new and cached diagnostic and status information do not match, the resolution engine 210 can update the displayed graphical interface with the new diagnostic and status information. As a result, the resolution engine 210 can quickly identify changes to the diagnostic and status information and update the graphical interface accordingly.

In this way, the emulated device DTM 212 can be used to fetch diagnostic and status information from field devices, such as at a specified interval. The benefits of FDT/DTM (such as the use of the communication DTMs 214) can be realized even when no actual device DTM is available or used. The server 204 could interpret or otherwise map the diagnostic and status information to a more appropriate form, such as by using the DD/EDD files 216 for the field devices. Because of this, the flexibility in retrieving diagnostic and status information provided by EDDL can be used in conjunction with (and can receive many of the benefits associated with) FDT/DTM technology.

The resolution engine 210 includes any hardware, software, firmware, or combination thereof for interpreting, mapping, or otherwise processing diagnostic and status information. The emulated device DTM 212 includes any hardware, software, firmware, or combination thereof for emulating at least some functions of at least one device DTM. It may be noted that a single emulated device DTM 212 could be used to emulate one or multiple types of device DTMs, or multiple emulated device DTMs 212 could be used. The communication DTM 214 includes any hardware, software, firmware, or combination thereof for enabling communication with a field device using a particular type of communication link or protocol. The data exchanged between DTMs (emulated or other) could have any suitable form, such as eXtensible Markup Language ("XML") documents. Also note that the communication interface component 206 can implement the FDT Frame interface to host the communication DTM 214, which allows communications with the field devices using standard or proprietary communication interfaces. In addition, the cache 218 includes any suitable structure for storing and facilitating retrieval of information.

Although FIG. 2 illustrates one example of a mechanism 200 for accessing and presenting health information for field devices in a process control system, various changes may be made to FIG. 2. For example, the client 202 could include any number of diagnostic and alarm units. Also, the communication interface component 206 could include any number of emulated device DTMs or communication DTMs. In addition, the server 204 could include any number of caches (and the use of the cache is optional).

FIG. 3 illustrates an example user interface 300 for accessing and presenting health information for field devices in a process control system according to this disclosure. The embodiment of the user interface 300 shown in FIG. 3 is for illustration only. Other embodiments of the user interface 300 could be used without departing from the scope of this disclosure.

The user interface 300 in this example can be used to access and present health information (such as status and diagnostic information) for one or more field devices to a user. The user interface 300 could, for example, be presented by the diagnostics and status unit 208 of FIG. 2 on the operator station 112a-112b of FIG. 1.

In this example, the user interface 300 includes four sections 302-308. In this example, the section 302 includes a navigable menu structure that defines the network topology of all or a portion of the process control system 100. For example, "MUX A" could correspond to the upper multiplexer 106 in the control network 104a of FIG. 1, and "MUX B" and "MUX C" could correspond to the lower multiplexers 106 in the control network 104a of FIG. 1. Also, "FD A" through "FD C" could correspond to the field devices coupled to "MUX B," and "FD D" and "FD E" could correspond to the field devices coupled to "MUX C." Various identifiers in the navigable menu structure can be expanded and collapsed in order to reveal and hide different components arranged in the process control system 100. The lowest "level" in the navigable menu structure includes the field devices present in the process control system 100. A user could select a particular field device in the navigable menu structure, and detailed information about the selected field device (including status and diagnostic information) can be presented in section 308 of the user interface 300.

In the navigable menu structure in section 302 of FIG. 3, unhealthy field devices are indicated using dashed lines around their field device identifiers, while healthy field devices lack dashed lines around their field device identifiers. It may be noted that other types of indicators could be used, such as by using red text to identify unhealthy field devices and black text to identify healthy field devices. It may also be noted that the terms "healthy" and "unhealthy" can be used to denote any suitable condition (or lack thereof).

Unhealthy field devices (including those currently and not currently revealed in the navigable menu structure of section 302) are collectively identified in section 304 of the user interface 300. The section 304 therefore allows a user monitoring a set of field devices to quickly identify the unhealthy field devices.

The section 306 includes various controls for locating particular field devices. For example, a user could enter the name or other identifier for a particular field device in a text box and select the "Locate now" button, allowing the user to search for field device(s) having a matching identifier. Also, different tabs can be used to select either a network, device state, or device library view in the navigable menu structure of section 302. The device state view could list field devices based on the states of the field devices, while the device library view could list field devices based on the types of the field devices. Other views could also be used to display field devices for selection by the user.

Once a field device is selected by the user (such as its selection in the navigable menu structure of section 302, its selection in section 304, or its location through a search in section 306), detailed information about the field device can be shown in section 308. In this example, the detailed information includes the field device's configuration, status, and properties. For an unhealthy field device, the status or other data could provide an explanation why the field device has been identified as being unhealthy. The user could then take suitable corrective action, such as by entering configuration data to alter the operation of the field device or scheduling maintenance for the field device.

In this way, unhealthy or other field devices in the process control system could be quickly identified, and corrective actions could be initiated or executed. Moreover, the user interface 300 can be updated based on information retrieved by the server 204 from the field devices through an emulated device DTM. As a result, the user interface 300 can be updated without requiring a user to manually invoke a device DTM while still obtaining the benefits of using communication DTMs.

Although FIG. 3 illustrates one example of a user interface 300 for accessing and presenting health information for field devices in a process control system, various changes may be made to FIG. 3. For example, the user interface 300 could include any other or additional information in any suitable configuration. Also, any other suitable interface could be used to access or present health information for field devices to a user.

Figure 4:
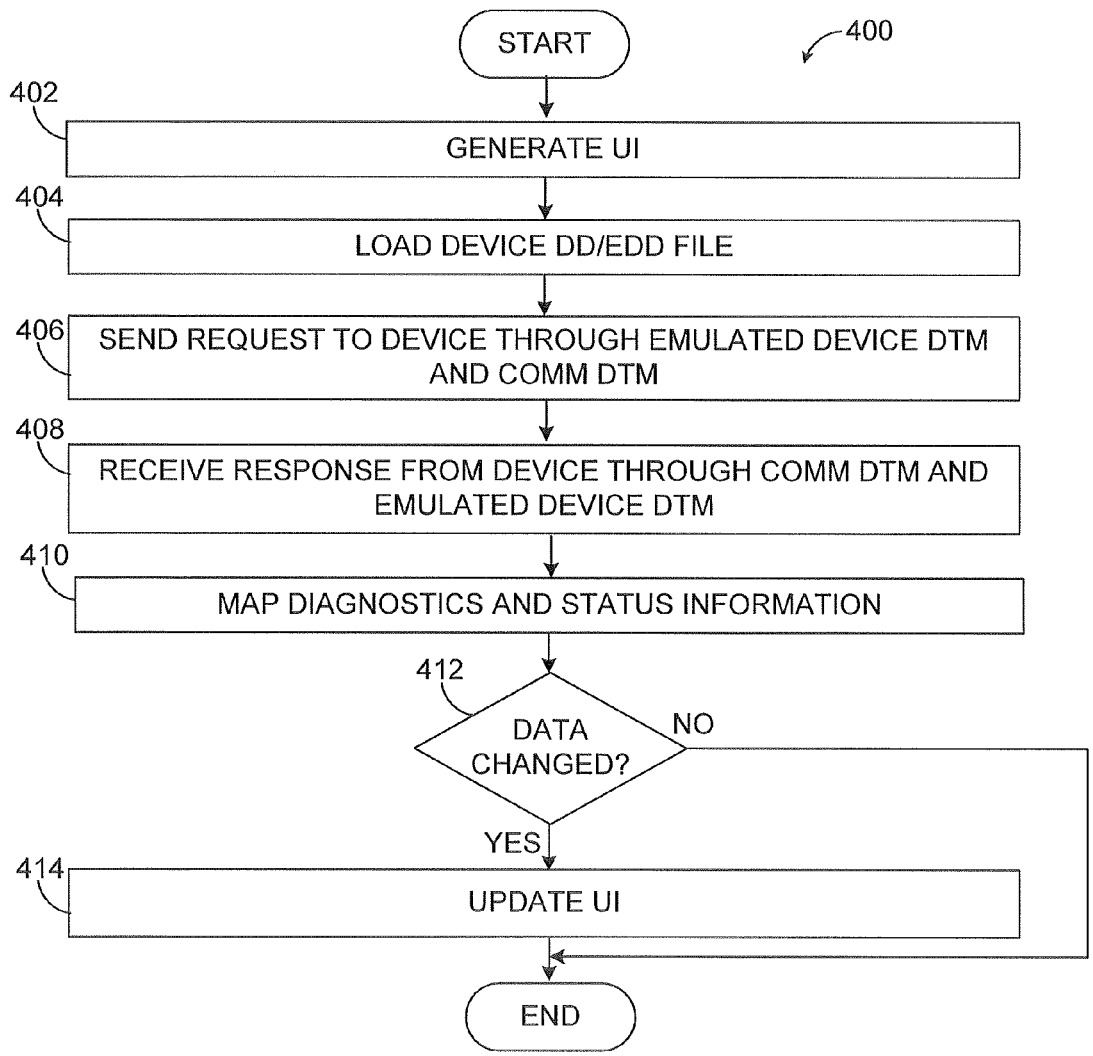
FIG. 4 illustrates an example method for accessing and presenting health information for field devices in a process control system according to this disclosure.

FIG. 4 illustrates an example method 400 for accessing and presenting health information for field devices in a process control system according to this disclosure. The embodiment of the method 400 shown in FIG. 4 is for illustration only. Other embodiments of the method 400 could be used without departing from the scope of this disclosure.

A user interface is generated at step 402. This could include, for example, the diagnostics and status unit 208 generating a user interface 300. When initially generated, the contents of the user interface 300 could be based on the diagnostics and status information in the cache 218, or the user interface 300 could be empty.

One or more DD/EDD files for one or more field devices are loaded at step 402. This could include, for example, the server 204 loading the DD/EDD files 216 for the field devices from the database server 110 into the resolution engine 210. The DD/EDD files 216 for multiple field devices could be loaded and used at the same time in the resolution engine 210 or individually loaded and used in the resolution engine 210.

A request is sent to one of the field devices through an emulated device DTM and a communication DTM at step 406. This could include, for example, the resolution engine 210 generating a request for status and diagnostic information. The request can be formatted into a suitable FDT/DTM format (such as an XML format). The request is routed to the communication DTM 214 through the emulated device DTM 212, so the communication DTM 214 accepts the request and sends it to the field device. A response to the request is received through the communication DTM and the emulated device DTM at step 408. The response could include the requested status and diagnostic information. The response is received from the field device by the communication DTM 214 and then provided to the emulated device DTM 212. In this way, the communication DTM 214 can be used to communicate with the field device and retrieve the diagnostic and status information, but a user is not required to manually invoke a device DTM to initiate the retrieval. Moreover, the diagnostic and status information can be retrieved from the field device using the communication DTM 214 automatically using the emulated device DTM 212.

The diagnostic and status information is mapped at step 410. This could include, for example, the resolution engine 210 determining what various diagnostic or status values mean for the field device using a DD/EDD file 216 for the field device. This could also include the resolution engine 210 examining the actual diagnostic or status values received from the field device and identifying descriptions associated with the received values.

The mapped diagnostic and status information is compared to prior data to determine if a change in the information has occurred at step 412. This could include, for example, the resolution engine 210 comparing the received diagnostic and status information to diagnostic and status information stored in the cache 218. If no change has occurred, the user interface need not be updated, and the method 400 ends. Otherwise, a change has been identified, and the user interface is updated at step 414. This could include, for example, causing the diagnostics and status unit 208 to update the user interface 300. The user interface 300 could be updated by indicating that a previously healthy field device is now unhealthy or that a previously unhealthy field device is now healthy. The user interface 300 could also change the field device's configuration, status, or properties in the user interface 300. The user interface could be used in any other suitable manner.

Although FIG. 4 illustrates one example of a method 400 for accessing and presenting health information for field devices in a process control system, various changes may be made to FIG. 4. For example, while shown as a series of steps, various steps in FIG. 4 could overlap, occur in parallel, or occur multiple times. As a particular example, steps 406-414 in the method 400 could be repeated multiple times for the same field device, such as at a specified interval. As another particular example, steps 404-414 in the method 400 could be performed for each of multiple field devices (possibly multiple times per device). In this way, the method 400 provides a mechanism for intermittent or continuous monitoring of field devices using FDT/DTM technology.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating a request for at least one of status information and diagnostic information associated with a field device in a process control system;
providing the request to a communication manager through an emulator, the emulator emulating a device manager associated with at least the field device, the communication manager configured to communicate the request to the field device over a communication link using a specified protocol;
receiving at least one of the status information and the diagnostic information from the field device through the communication manager and the emulator;
interpreting at least one of the status information and the diagnostic information using a device description or electronic device description (DD/EDD) file associated with the field device; and
generating and presenting a user interface based on at least one of the status information and the diagnostic information.

2. The method of claim 1, wherein:
the communication manager comprises a communication Device Type Manager (DTM); and
the emulator emulates at least some functions of a device DTM.

3. The method of claim 2, wherein:
interpreting at least one of the status information and the diagnostic information comprises mapping at least one of the status information and the diagnostic information from the field device to corresponding information defined by the DD/EDD file associated with the field device; and
the user interface is generated based on the mapping.

4. The method of claim 1, wherein the user interface is generated based on the interpretation of at least one of the status information and the diagnostic information.

5. The method of claim 1, further comprising:
comparing at least one of the status information and the diagnostic information to at least one of cached status information and cached diagnostic information.

6. The method of claim 5, wherein generating the user interface comprises updating the user interface if the status information differs from the cached status information or the diagnostic information differs from the cached diagnostic information.

7. The method of claim 1, wherein the request is provided to the communication manager and at least one of the status information and the diagnostic information is received from the field device without using an actual device manager designed for the field device.

8. The method of claim 1, further comprising:
providing requests to multiple field devices in the process control system through the emulator and at least one communication manager;

receiving at least one of the status information and the diagnostic information from each of the field devices through the emulator; and updating the user interface based on at least one of the received status information and the received diagnostic information.

9. The method of claim 8, wherein the user interface comprises:

a navigable menu structure identifying components in the process control system, the components including the field devices;

a list of field devices identified as being unhealthy based on at least one of the received status information and the received diagnostic information; and information associated with a selected one of the field devices.

10. The method of claim 1, wherein the field device comprises at least one of:

a sensor and an actuator.

11. A system comprising:

a server configured to generate a request for at least one of status information and diagnostic information associated with a field device in a process control system; and an interface component comprising (i) an emulator configured to emulate a device manager associated with the field device and (ii) a communication manager configured to communicate with the field device over a communication link using a specified protocol;

wherein the server is configured to provide the request to the communication manager through the emulator, receive at least one of the status information and the diagnostic information from the field device through the communication manager and the emulator, interpret at least one of the status information and the diagnostic information using a device description or electronic device description (DD/EDD) file associated with the field device, and generate a user interface based on at least one of the status information and the diagnostic information.

12. The system of claim 11, wherein:

the communication manager comprises a communication Device Type Manager (DTM); and the emulator is configured to emulate at least some functions of a device DTM.

13. The system of claim 11, further comprising:

a client configured to present the user interface to a user.

14. The system of claim 11, wherein:

the server is configured to interpret at least one of the status information and the diagnostic information by mapping at least one of the status information and the diagnostic information from the field device to corresponding information defined by the DD/EDD file associated with the field device; and the server is configured to generate the user interface based on the mapping.

15. The system of claim 11, the server is configured to generate the user interface based on the interpretation of at least one of the status information and the diagnostic information.

16. The system of claim 11, wherein:

the server comprises a cache configured to store at least one of cached status information and cached diagnostic information; and the server is further configured to compare at least one of the status information and the diagnostic information to at least one of the cached status information and the cached diagnostic information.

17. The system of claim 16, wherein the server is configured to update the user interface if the status information differs from the cached status information or the diagnostic information differs from the cached diagnostic information.

18. An apparatus comprising:

a memory configured to store at least one of status information and diagnostic information associated with a field device in a process control system; and a processor configured to:

generate a request for at least one of the status information and the diagnostic information;

provide the request to a communication manager through an emulator, the emulator configured to emulate a device manager associated with at least the field device, the communication manager configured to communicate the request to the field device over a communication link using a specified protocol;

receive at least one of the status information and the diagnostic information from the field device through the communication manager and the emulator;

interpret at least one of the status information and the diagnostic information using a device description or electronic device description (DD/EDD) file associated with the field device; and generate and present a user interface based on at least one of the status information and the diagnostic information.

19. The apparatus of claim 18, wherein the processor is configured to interpret at least one of the status information and the diagnostic information by mapping at least one of the status information and the diagnostic information from the field device to corresponding information defined by the DD/EDD file associated with the field device;

wherein the user interface is generated based on the mapping.

20. The apparatus of claim 18, wherein the processor is further configured to:

compare at least one of the status information and the diagnostic information to at least one of cached status information and cached diagnostic information; and update the user interface if the status information differs from the cached status information or the diagnostic information differs from the cached diagnostic information.

* * * * *